United States Patent [19]

Aoki

[11] 4,276,014
[45] Jun. 30, 1981

[54] NOZZLE DEVICE FOR MOLDING PLASTICS

[76] Inventor: Katashi Aoki, 6037 Ohaza-Minamijo, Sakaki-machi, Hanishina-gun, Nagano-ken, Japan

[21] Appl. No.: 27,021

[22] Filed: Apr. 4, 1979

[30] Foreign Application Priority Data

Apr. 8, 1978 [JP] Japan .............................. 53-46344[U]

[51] Int. Cl.³ .......................... B29F 1/03; B29F 1/08
[52] U.S. Cl. .................................. 425/547; 425/548; 425/549; 425/570
[58] Field of Search ................ 425/549, 570, 547, 548

[56] References Cited

U.S. PATENT DOCUMENTS

| | | | |
|---|---|---|---|
| 2,871,517 | 2/1959 | Allard | 425/570 |
| 3,923,209 | 12/1975 | Roy | 425/570 X |
| 4,017,242 | 4/1977 | Mercer | 425/548 X |
| 4,095,931 | 6/1978 | Reitan | 425/549 X |

FOREIGN PATENT DOCUMENTS

| | | | |
|---|---|---|---|
| 1194317 | 11/1959 | France | 425/570 |
| 1217564 | 5/1960 | France | 425/570 |
| 46-4069 | 2/1971 | Japan | 425/570 |
| 835440 | 5/1960 | United Kingdom | 425/548 |
| 1337384 | 11/1973 | United Kingdom | 425/570 |

*Primary Examiner*—Thomas P. Pavelko
*Attorney, Agent, or Firm*—Weingarten, Maxham & Schurgin

[57] ABSTRACT

A nozzle device used for injection-molding plastic products. In the present nozzle device, the hot runner may be formed into a block and set to a mold clamping mechanism irrespective of cavity mold. The device comprises a hot runner block of fixed length having a plurality of nozzles at one side thereof and a sprue at the other side thereof, the nozzles and the sprue being placed in communication with each other by the runner, and a base plate having a plurality of support plates. The nozzles may accessibly come into contact with gates of a cavity mold. In this device, no overheating occurs in the periphery of the gates of the mold.

3 Claims, 4 Drawing Figures

NOZZLE DEVICE FOR MOLDING PLASTICS

BACKGROUND OF THE INVENTION

1. Field of the Invention

This invention relates to a nozzle device used when a plurality of plastic molded products are subjected to injection molding.

2. Description of the Prior Art

In the case a plurality of molded products are desired to be obtained by a single step of injection molding, a runner need be provided to introduce the molten material in the form of plastics from a sprue to gates of cavities. This runner is positioned in a hot runner which constitutes a part of a mold. For this reason, there have been involved various disadvantages that the mold becomes complicated in construction, that since nozzles of the hot runner are always in contact with the gates of cavity molds, even if the cavity molds are cooled, the peripheries of the gates are overheated due to consecutive molding to often produce defective articles, and that in the case the material within the hot runner carbonated because of the overheating is removed, it is not possible to remove only the hot runner; the molds must also be dismantled.

SUMMARY OF THE INVENTION

According to the present invention, the aforesaid hot runner portion, which has been originally constructed as a part of the mold, is formed into a block mold to provide a nozzle device independently of the mold and can be set to a mold clamping mechanism irrespective of the cavity mold. In addition, the device may be cleaned upon removal thereof and the nozzle touching may be effected only at the time of injection by the action of spring, thereby eliminating those disadvantages noted above with respect to the conventional hot runner cavities.

BRIEF DESCRIPTION OF THE DRAWINGS

The invention will be described in detail by way of embodiments in connection with the accompanying drawings in which.

DESCRIPTION OF THE PREFERRED EMBODIMENTS

Figure 1:
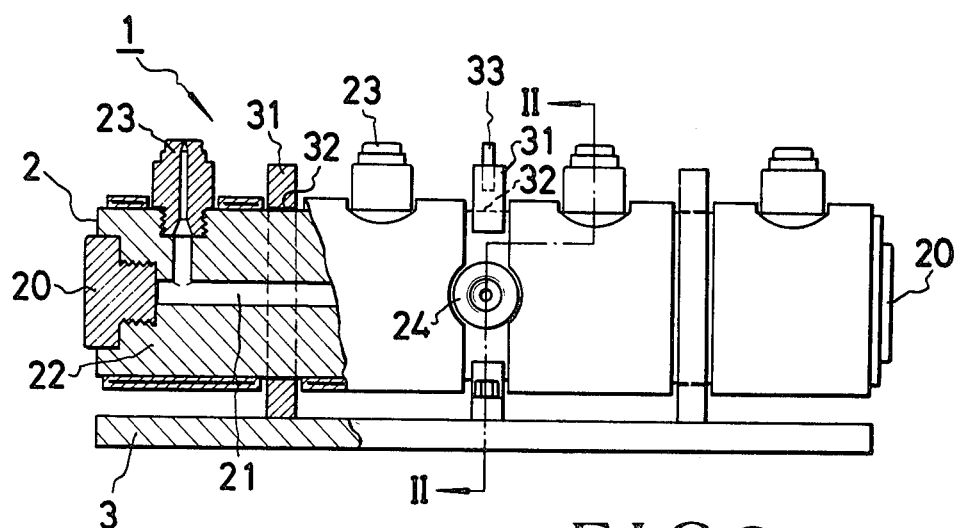
FIG. 1 is a partially cutaway front view of a nozzle device.
Figure 2:
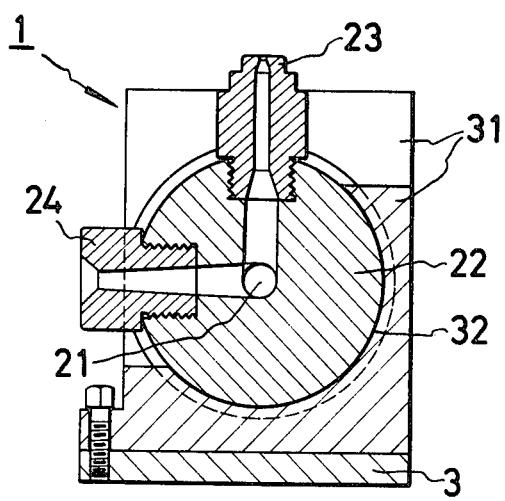
FIG. 2 is a sectional view taken along line II—II of FIG. 1.

A nozzle device 1 shown here as one embodiment is composed of a hot runner block 2 and a base plate 3.

The hot runner block 2 comprises a body 22 as a cylindrical body having a runner 21 whose opposite ends in a central longitudinally extending hole are blocked by plugs 20, 20, the body 22 having at one side the desired number of nozzles 23, 23 detachably screwed projectingly in given spaced relationship and at the other side a sprue 24 screwed thereon so that the nozzles 23, 23 and sprue 24 are placed in communication with each other by the runner 21.

While in the illustrated embodiment, the nozzles 23, 23 and sprue 24 are at right angles in positional relation, and the sprue 24 is mounted in the middle of the body. It should be noted that the mounting position of the sprue relative to the nozzles and runner may be suitably selected depending upon a mold clamping device and mold construction employed here and is not limited to the state shown.

The base plate 3 is formed from a rectangular steel plate and has at one side thereof a plurality of support plates 31, 31 stood upright in given spaced relationship. The support plates 31, 31 have at their sides holes 32, 32 bored respectively to receive the hot runner block 2, the central support plate 31 having at its end a guide pin 33 mounted.

The hot runner block 2 is then laterally secured to the support plates 31, 31 to be coupled to the base plate 3 integrally and stopped at and secured to a movable plate through the base plate 3, and the nozzles 23, 23 may come into touch and move away from gates of the cavity mold.

Figure 3:
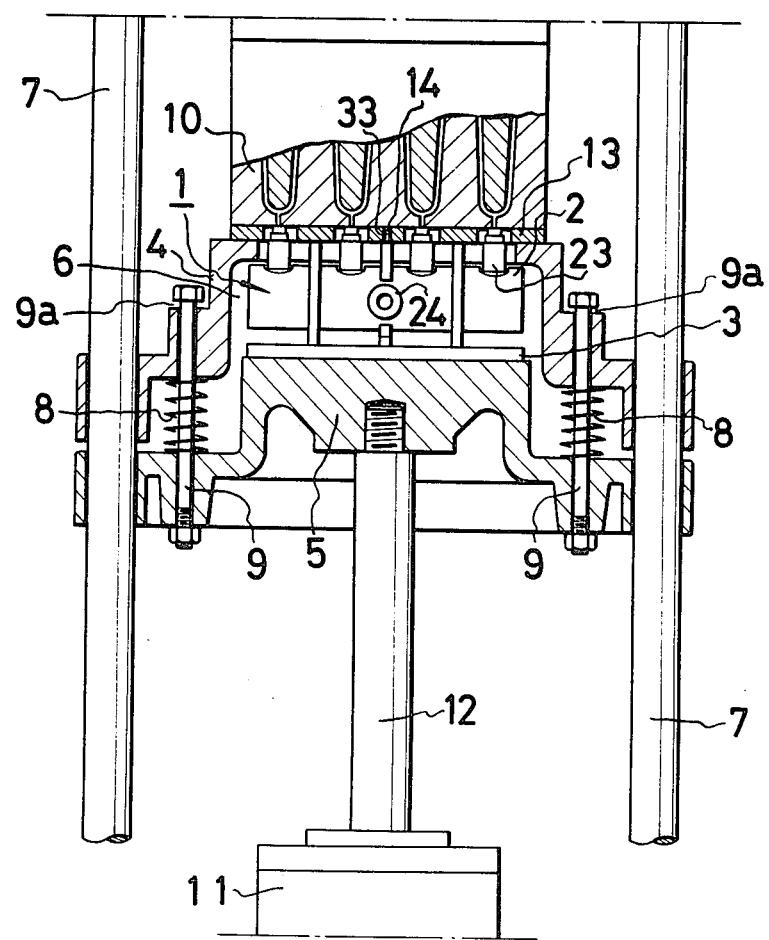
FIG. 3 is a partially longitudinal sectional front view of the device when mold is closed in a state where the nozzle device is mounted on the movable plate on the side of a mold clamping ram and set to the cavity mold.
Figure 4:
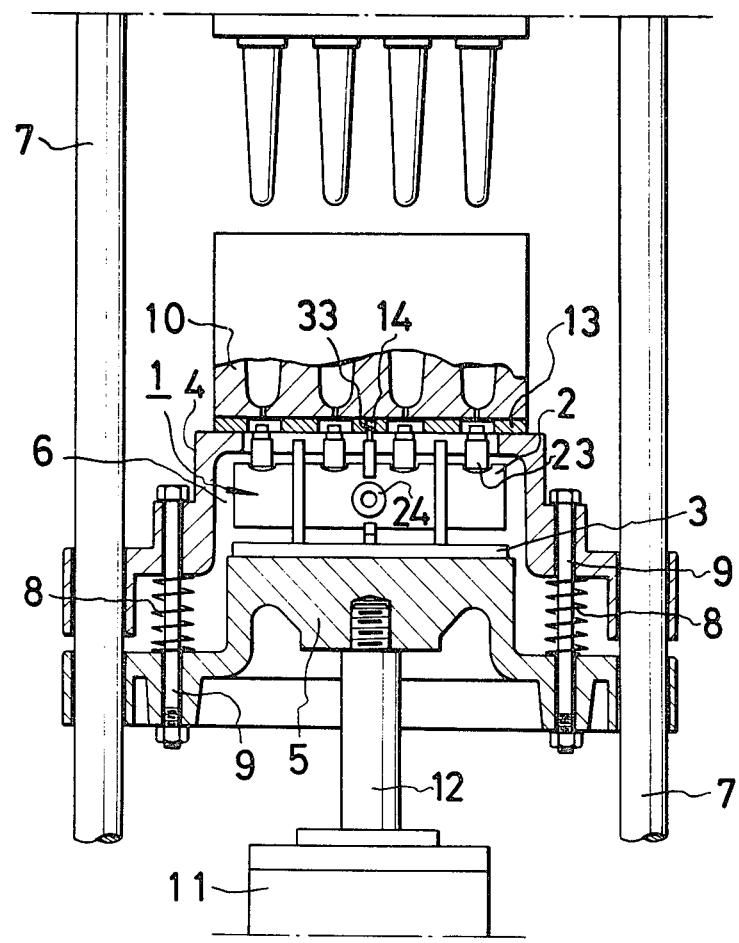
FIG. 4 is a partially longitudinal sectional front view of the device when mold is opened in a state similar to FIG. 3.

Next, the above-mentioned nozzle device 1 and mold clamping mechanism will be explained with reference to FIG. 3. This mold clamping mechanism comprises a fixed plate at the upper part thereof to receive mold clamping pressure and a mold clamping hydraulic cylinder secured at the lower part thereof, and a pair of tie bars 7, 7 are provided in desired spaced relation over the fixed plate and a lower base plate.

Between the tie bars 7, 7 there are arranged a die plate 4 on which cavity mold 10 is fixed and a movable plate 5 on which said nozzle device 1 is fixed with a spacing 6 in a manner placed one over the other, opposite ends thereof being movably slipped on the tie bars 7, 7.

The die plate 4 and movable plate 5 have portions, on which cavity mold 10 and nozzle device 1 are placed, formed much higher than the opposite ends thereof, the die plate 4 having its central portion formed into holes to receive the nozzles 23, 23 of the nozzle device 1 positioned in the space 6.

The die plate 4 and movable plate 5 arranged one over the other are connected by pins 9, 9 extended through opposite ends thereof with clearances 9a, and coil springs 8 retained about the pins 9 are provided in touch with both plates to move the movable plate 5 by said clearance 9a when the mold clamping force is released.

The nozzle device 1 is mounted with the base plate 3 placed on the upper surface of the movable plate 5 before the die plate 4 and movable plate 5 are connected by the pins 9, 9. The guide pin 33 is inserted into a guide hole 14 in a setting plate 13 placed on the die plate 4 so that when the nozzle touch force caused by the hydraulic device 11 is released, the movable plate 5 may be moved by the springs 8, 8 through the preset clearance 9a between the ends of the pins 9, 9 away from the gates of the cavity mold 10 but not displaced laterally.

In the mold clamping mechanism with the nozzle device 1 incorporated as mentioned above, the movable plate 5 is normally biased downwards together with the nozzle device 1 through a dimension equal to the clearance 9a in the pin 9 by the action of coil springs 8, 8, and as a result, the nozzles 23, 23 are also positioned away from the gates of the cavity mold 10 through a dimension equal to the clearance 9a.

Thus, at the time of mold-clamping, that is, when the cavity mold 10 is closed by upward movement of the plunger 12 and the mold clamping force is further applied, the coil springs 8, 8 are compressed after the mold is closed and only the movable plate 5 moves so that the nozzle device 1 secured to the movable plate 5 advances towards the cavity mold 10, and the nozzles 23, 23 positioned apart through a dimension equal to the clearance 9a may come into nozzle-touch with the gates. (FIG. 3)

Conversely, at the time of mold-opening after molding, pressure against the coil springs 8, 8 is removed at the same time the mold-clamping force is released so that as soon as the plunger 12 moves down, the coil springs 8, 8 are returned to cause the movable plate 5 to be moved downward through a clearance portion before the mold-opening, thus moving the nozzles 23, 23 away from the gates as previously described.

As a consequence, the nozzle touching is carried out every mold-clamping to prevent overheating produced around the gates whose cause possibly results from normal contact of heated nozzles. In addition, since the portion to be handled as the hot runner of mold is made independently of the nozzle device, it can be replaced with another when trouble occurs or when cleaning is performed, and such replacement may be carried out very easily in a short period of time, thus offering an excellent advantage also in terms of working property.

What is claimed is:

1. A nozzle device for a plastic molding apparatus comprising:
    a base plate;
    a plurality of generally parallel support plates secured to said base plate and extending upwardly therefrom;
    a hot runner block having a cylindrical shape and a fixed axial length, said hot runner block being integrally coupled to each of said support plates in spaced relation with said base plate, the axis of said hot runner block being disposed generally parallel to said base plate and perpendicular to said support plates;
    a plurality of nozzles projecting radially from one side of said hot runner block, said nozzles being detachable from said hot runner block;
    a sprue projecting radially from said hot runner block along a side thereof other than said one side;
    a runner disposed internally of said hot runner block and providing communication between said sprue and each of said plurality of nozzles to permit molten plastic to pass from said sprue to each of said nozzles, said runner extending axially of said hot runner block and being generally centrally disposed therein;
    means for bringing said nozzles into contact with gates of a mold cavity;
    a plug disposed at each axial end of said runner of said hot runner block, each of said plugs being removable externally of said hot runner block for cleaning of said runner; and
    heater bands disposed around exterior radial surfaces of said hot runner block.

2. A nozzle device according to claim 4, wherein one of said support plates of said hot runner block comprises a guide pin disposed at an end thereof and extending radially away from said hot runner block on said one side of said hot runner block.

3. The nozzle device according to claim 1 wherein said sprue is spaced from said plurality of nozzles along the outer surface of said hot runner block a distance generally equal to the length of the arc subtending an angle of generally 90° formed by two radii of said hot runner block, and wherein said sprue is generally centrally disposed with respect to said axial length of said hot runner block.

* * * * *